United States Patent [19]

Ohno et al.

[11] Patent Number: 4,805,940

[45] Date of Patent: Feb. 21, 1989

[54] FOUR-WHEEL STEERABLE MOTOR VEHICLE

[75] Inventors: Kenichi Ohno; Kanji Kubo, both of Tochigi, Japan

[73] Assignee: Honda Giken Kogyo Kabushiki Kaisha, Tokyo, Japan

[21] Appl. No.: 178,207

[22] Filed: Apr. 6, 1988

[30] Foreign Application Priority Data

Apr. 8, 1987 [JP] Japan .................................. 62-86575

[51] Int. Cl.$^4$ ............................................... B62D 5/00
[52] U.S. Cl. ...................................... 280/91; 280/661; 280/675
[58] Field of Search .......................... 280/91, 661, 675

[56] References Cited

U.S. PATENT DOCUMENTS

| | | | |
|---|---|---|---|
| 3,497,233 | 2/1970 | Bolaski | 280/661 |
| 4,687,214 | 8/1987 | Uno | 280/91 |
| 4,687,216 | 8/1987 | Kawamoto et al. | 280/91 |
| 4,726,603 | 2/1988 | Sugiyama et al. | 280/661 |
| 4,756,546 | 7/1988 | Kubo et al. | 280/661 |

Primary Examiner—Kenneth R. Rice
Attorney, Agent, or Firm—Irving M. Weiner; Joseph P. Carrier; Pamela S. Burt

[57] ABSTRACT

A four-wheel steerable motor vehicle has a mechanism for steering front wheels in response to turning motion of a steering wheel, and a mechanism for steering rear wheels in response to steering of the front wheels. The rear wheels have camber with respect to ground which is more negative than camber of the front wheels with respect to ground. The motor vehicle also has front wheel suspensions supporting said front wheels, respectively, and rear wheel suspensions supporting said rear wheels, respectively, the front and rear wheel suspensions being of the double-wishbone type.

9 Claims, 5 Drawing Sheets

FOUR-WHEEL STEERABLE MOTOR VEHICLE

BACKGROUND OF THE INVENTION

1. Field of the Invention

The present invention relates to a motor vehicle having steerable front and rear wheels.

2. Description of the Relevant Art

When ordinary motor vehicles with steerable front wheels (hereinafter referred to as a "2WS motor vehicle") curve around a corner, they are required to make a quick turn and return to a straight course with good response upon turning of the steering wheel. There have been proposed in recent years various motor vehicles with steerable front and rear wheels (hereinafter referred to as a "4WS motor vehicle") for improved steering feeling. In such a 4WS motor vehicle, the angle through which the rear wheels are turned is always smaller than the angle through which the front wheels are turned. The 4WS motor vehicles are also required to make a turn and return to a straight course quickly in response to turning of the steering wheel.

In a 2WS motor vehicle, the rate of change of camber Cgf of the front wheels with respect to ground remains small for the full performance of the front wheel tires in a range from straight-course travel to a turn. In view of this advantage, many 2WS motor vehicles have double-wishbone independent suspensions associated with the front wheels. The rear wheels are combined with various suspensions such as link, swing-arm, semi-trailing, and full-trailing suspensions.

Figure 7:
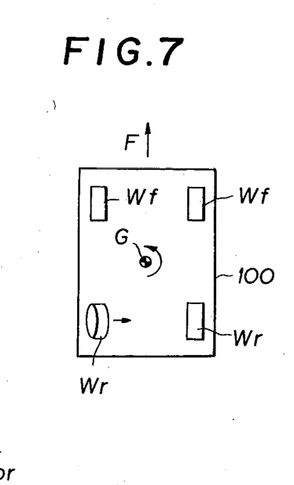
FIG. 7 is a schematic view illustrating the manner in which a rear wheel of a motor vehicle with steerable front wheels is affected by a disturbance to one of the rear wheels.

With a double-wishbone independent suspension, camber Cg of the wheel with respect to ground while the vehicle body is rolling during a turn remains substantially the same as camber Cg of the wheel with respect to ground during travel along a straight course. Stated otherwise, camber Cb of the wheel with respect to the vehicle body while the vehicle body is rolling varies from camber Cb of the wheel with respect to the vehicle body while in straight travel. This variation in camber depends on the direction and magnitude of rolling of the vehicle body which in turn depend on the direction in which the vehicle turns. Under a neutral condition in which the vehicle body is not rolling, the vehicle body lies parallel to the road surface, and hence camber Cg of the wheel with respect to ground is equal to camber Cb of the wheel with respect to the vehicle body. It is now assumed with reference to FIG. 7 of the accompanying drawings that while a motor vehicle 100 with two steerable front wheels Wf is running straight in a forward direction F, a lefthand rear wheel Wr rides on a road bump (not shown) with its upper surface inclined inwardly in the transverse direction of the vehicle. Now, the lower portion of this rear wheel Wr is displaced outwardly from its neutral position. As a result, an additional camber thrust Tc is produced inwardly in the transverse direction of the vehicle. The additional camber thrust Tc is transmitted through an arm of the rear wheel suspension (not shown) and other members to the vehicle body, which is then subjected to yawing counterclockwise (FIG. 7) about the center of gravity G of the vehicle. This problem also occurs when one of the rear wheels Wr is affected by some disturbance while the motor vehicle is turning.

The present invention has been made in an effort to meet the aforesaid requirement on 4WS motor vehicles and also to solve the problem which would be encountered with a 4WS motor vehicle having a double-wishbone independent suspension associated with a rear wheel.

SUMMARY OF THE INVENTION

It is an object of the present invention to provide a 4WS motor vehicle which is quickly responsive to turning of a steering wheel and can be quickly returned from a steered condition, through the full utilization of a smaller rear wheel steering angle than a front wheel steering angle.

Another object of the present invention is to provide a 4WS motor vehicle in which front and rear wheels can be kept in good balance in a range from running along a straight course to making a turn.

Still another object of the present invention is to provide a 4WS motor vehicle in which the full performance of front and rear wheels can be ensured in a range from running along a straight course to making a turn.

To accomplish the above objects, there is provided in accordance with the present invention a four-wheel steerable motor vehicle comprising a steering wheel, front wheels, rear wheels, a mechanism for steering the front wheels in response to turning motion of the steering wheel, and a mechanism for steering the rear wheels in response to steering of the front wheels, the rear wheels having camber with respect to ground which is more negative than camber of the front wheels with respect to ground.

The four-wheel steerable motor vehicle further includes front wheel suspensions supporting the front wheels, respectively, and rear wheel suspensions supporting the rear wheels, respectively, the front and rear wheel suspensions being of the same type.

Each of the front and rear wheel suspensions comprises a double-wishbone suspension.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
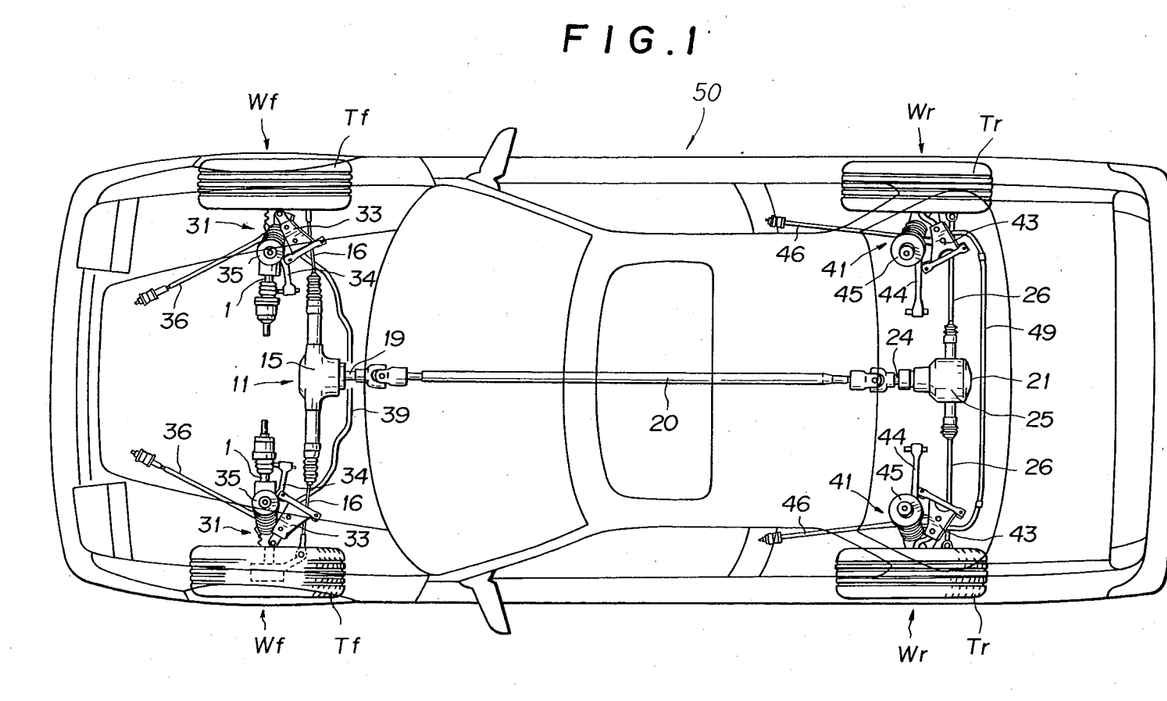
FIG. 1 is a schematic plan view of a four-wheel steerable motor vehicle according to a preferred embodiment of the present invention.
Figure 2:
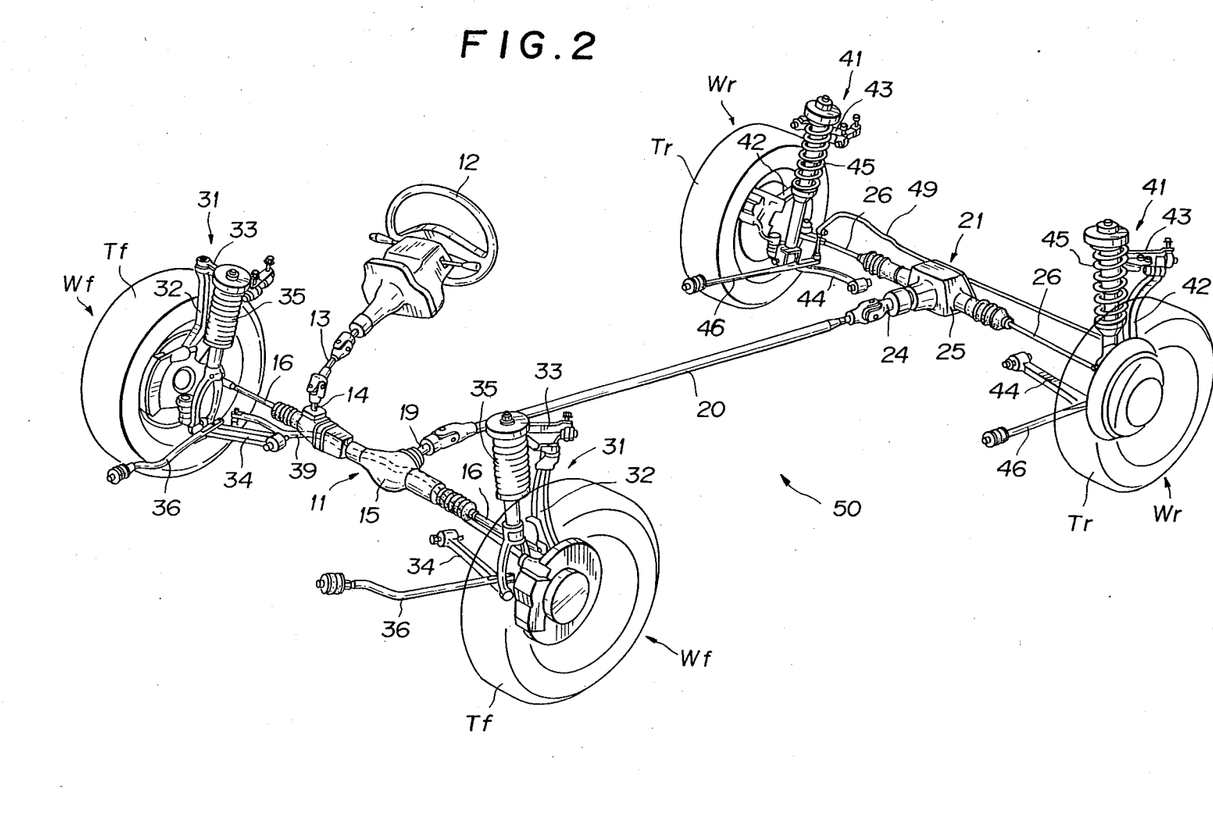
FIG. 2 is a perspective view of a suspension system and a steering system of the motor vehicle shown in FIG. 1.

FIGS. 1 and 2 show a four-wheel steerable motor vehicle (hereinafter referred to as a "4WS motor vehicle") 50 according to a preferred embodiment of the present invention, the 4WS motor vehicle 50 having a pair of double-wishbone front wheel suspensions 31 and a pair of double-wishbone rear wheel suspensions 41. The motor vehicle 50 is of the front wheel drive type, as described later on. The front wheel suspensions 31 support respective front wheels Wf with tires Tf mounted thereon, and the rear wheel suspensions 41 support respective rear wheels Wr with tires Tr mounted thereon. The motor vehicle 50 also has steering mechanisms 11, 21 for steering the front and rear wheels Wf, Wr, respectively.

The front wheel steering mechanism 11 has a gearbox 15 having an input pinion shaft 14 coupled to a steering wheel 12 through an intermediate shaft 13. In the gearbox 15, there is disposed a rack (not shown) having on one side rack teeth meshing with a pinion (not shown) on an inner end of the pinion shaft 14, the rack being axially movable in the transverse direction of the motor vehicle. The rack has its opposite ends coupled respectively to the inner ends of a pair of tie rods 16 with their outer ends connected to knuckles 32, respectively, on which the front wheels Wf are rotatably supported. When the tie rods 16 are displaced transversely of the motor vehicle, the knuckles 32 are turned about lines interconnecting their upper and lower pivoted points to turn the front wheels Wf.

An output pinion shaft 19 extends rearwardly from the central rear portion of the gearbox 15, the output pinion shaft 19 having a pinion (not shown) on a front end thereof meshing with rack teeth on the other side of the rack. The pinion shaft 19 has a rear end coupled via a universal joint to the front end of an elongate linkage shaft 20 disposed centrally across the motor vehicle and extending longitudinally thereof.

The rear wheel steering mechanism 21 has a gearbox 25 housing therein an input pinion shaft 24 which has a pinion (not shown) on a front end thereof coupled to the rear end of the linkage shaft 20 through a universal joint. The gearbox 25 also houses therein a function generating mechanism (not shown) to which rotation of the pinion shaft 24 is transmitted and a rear wheel steering rod (not shown) joined to the function generating mechanism and movable in the transverse direction of the motor vehicle. The rear wheel steering rod has its opposite ends coupled to the inner ends of a pair of tie rods 26 with their outer ends connected to knuckles 42, respectively, on which the rear wheels Wr are rotatably supported. By displacing the tie rods 26 in the transverse direction of the motor vehicle, the knuckles 42 are turned about lines interconnecting their upper and lower pivoted points to turn the rear wheels Wr. The function generating mechanism in the gearbox 25 moves the tie rods 26 transversely of the motor vehicle in response to rotation of the pinion shaft 24. When the front wheels Wf are turned through a relatively small angle by angular movement of the steering wheel 12 through a small angle, such as during medium- and high-speed travel of the vehicle, the function generating mechanism turns the rear wheels Wr in the same direction as the front wheels Wf. When the front wheels Wf are turned through a relatively large angle by angular movement of the steering wheel 12 through a large angle, such as during low-speed travel of the vehicle, the function generating mechanism turns the rear wheels Wr in the opposite direction to the front wheels Wf. In either case, the angle through which the rear wheels Wr are turned is always smaller than the angle through which the front wheels Wf are turned. The function generating mechanism may generate a function in response to not only the steering angle but also in response to the speed of travel of the motor vehicle.

The steering rotation transmission mechanism in the gearbox 15 is preferably of the rack-and-pinion type as illustrated, but may be a ball-and-nut mechanism.

Since the front wheel suspension mechanisms 31 and the rear wheel suspension mechanisms 41 are of the same type, the front wheels Wf and the rear wheels Wr are desirably kept in good balance in a large range from a condition in which the motor vehicle runs straight to a condition in which it makes a turn.

Figure 3:
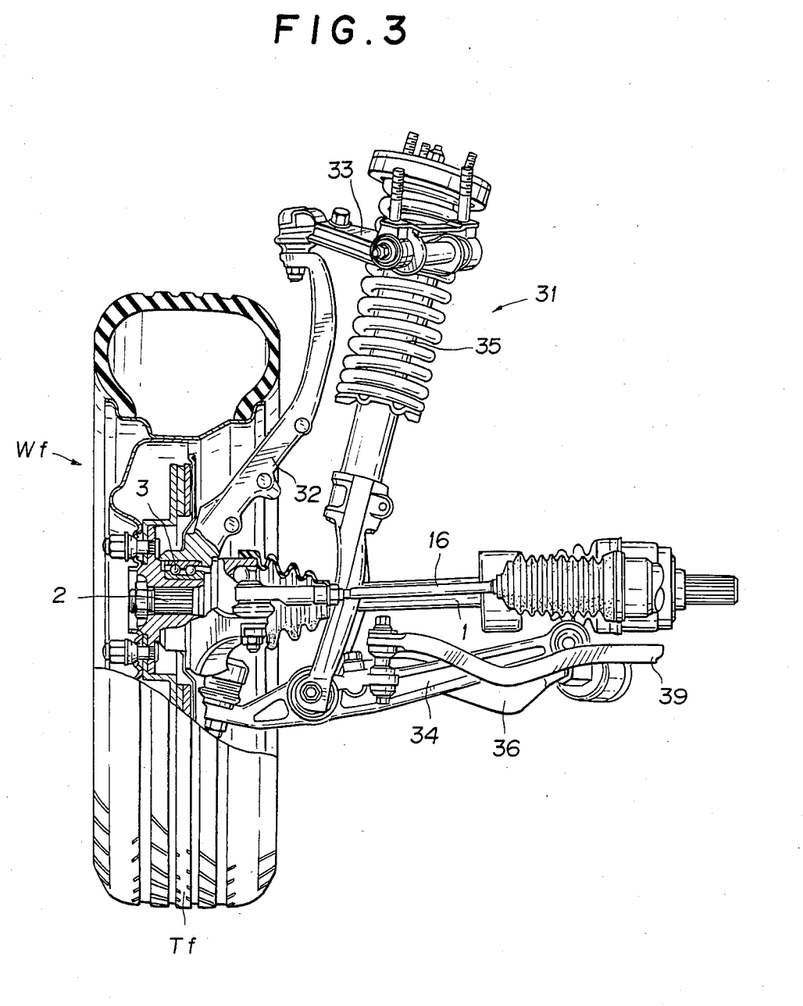
FIG. 3 is an enlarged rear elevational view of a front wheel suspension of the motor vehicle.

As shown in FIGS. 1-3, each of the double-wishbone front wheel suspensions 31 comprises a relatively short upper arm 33 substantially in the shape of "A" as viewed in plan, a relatively long lower arm 34 substantially in the shape of "I", the knuckle 32 with its upper and lower ends pivotally connected to the outer ends of the arms 33, 34, a hydraulic damper 35 having a lower end coupled to the lower arm 34, and a radius rod 36 having a rear end coupled to the lower arm 34. The upper arm 33 lies substantially horizontally in the transverse direction of the motor vehicle with its highest portion directed outwardly, and has a longitudinal axis oriented obliquely rearwardly of the motor vehicle. The lowest portion of the upper arm 33 is pivotally supported on the body of the motor vehicle so that the upper arm 33 is vertically swingable. The lower arm 34 is disposed substantially horizontally in the transverse direction of the motor vehicle and has an inner end pivotally supported on the vehicle body so that the lower arm 34 is vertically swingable. The hydraulic damper 35 is directed substantially vertically with its upper end supported on the vehicle body. The front end of the radius rod 36 is pivotally supported on the vehicle body so that the radius rod 36 is vertically swingable. A stablizer 39 is connected and extends between the lower arms 34 of the front wheel suspensions 31.

The front wheel Wf is a drive wheel which can be rotated by an axle 2 rotatably supported on the lower end of the knuckle 32 by means of a bearing 3. To the axle 2, there is connected the outer end of a drive shaft 1 which can be rotated about its own axis by an engine (not shown) through a transmission (not shown). As shown in FIG. 1, the lower arms 34 serve as front lower arms, whereas the tie rods 16 serve as rear lower arms.

Figure 4:
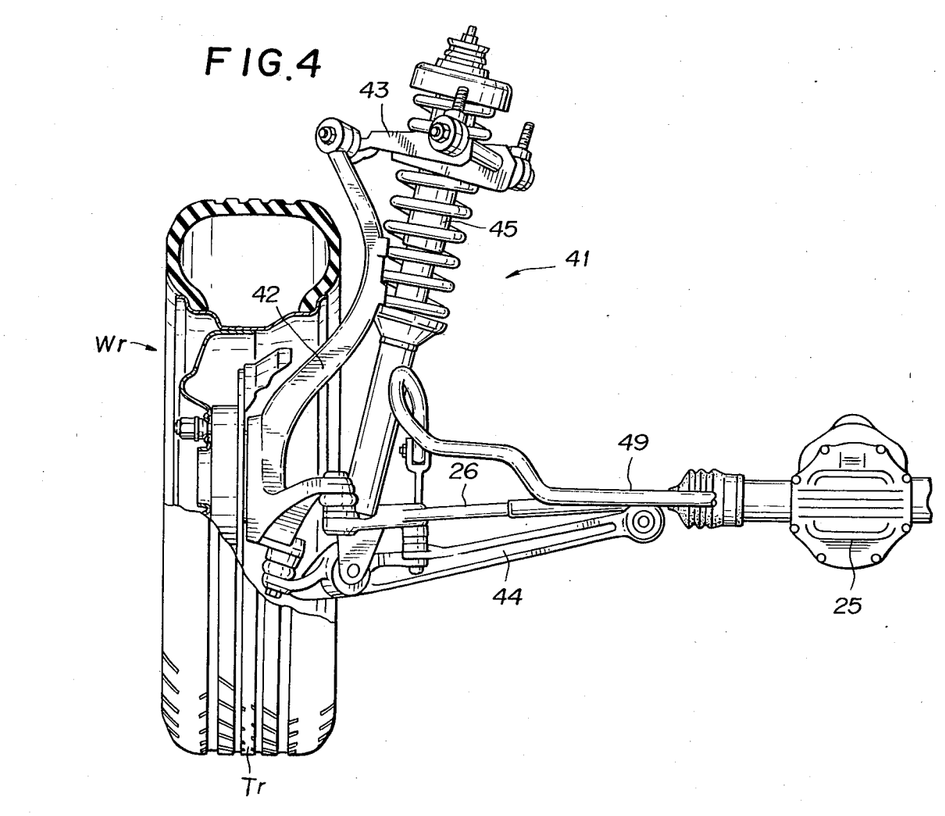
FIG. 4 is an enlarged rear elevational view of a rear wheel suspension of the motor vehicle.

As illustrated in FIGS. 1, 2 and 4, each of the doublewishbone rear wheel suspensions 41 comprises a relatively short upper arm 43 substantially in the shape of "A" as viewed in plan, a relatively long lower arm 44 substantially in the shape of "I", the knuckle 42 with its upper and lower ends pivotally connected to the outer ends of the arms 43, 44, a hydraulic damper 45 having a lower end coupled to the lower arm 44, and a radius rod 46 having a rear end coupled to the lower arm 44. The upper arm 43 lies substantially horizontally in the transverse direction of the motor vehicle with its highest portion directed outwardly, the upper arm 43 having a longitudinal axis oriented obliquely rearwardly of the motor vehicle. The lowest portion of the upper arm 43 is pivotally supported on the body of the motor vehicle so that the upper arm 43 is vertically swingable. The lower arm 44 is disposed substantially horizontally in the transverse direction of the motor vehicle and has an inner end pivotally supported on the vehicle body so that the lower arm 44 is vertically swingable. The hydraulic damper 45 is directed substantially vertically with its upper end supported on the vehicle body. The front end of the radius rod 46 is pivotally supported on the vehicle body so that the radius rod 46 is vertically swingable. A stablizer 49 is connected and extends between the lower arms 44 of the front wheel suspensions 41.

The rear wheel Wr is a driven wheel which is rotatably supported by an axle (not shown) fixed to the lower end of the knuckle 42. As shown in FIG. 1, the lower arms 44 serve as front lower arms, whereas the tie rods 26 serve as rear lower arms.

Figure 5:
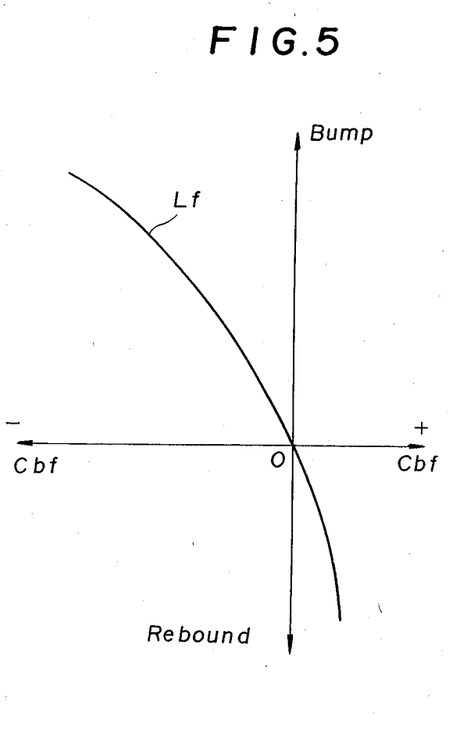
FIGS. 5 and 6 are graphs showing how camber of front and rear wheels with respect to the vehicle body of the motor vehicle varies.
Figure 6:
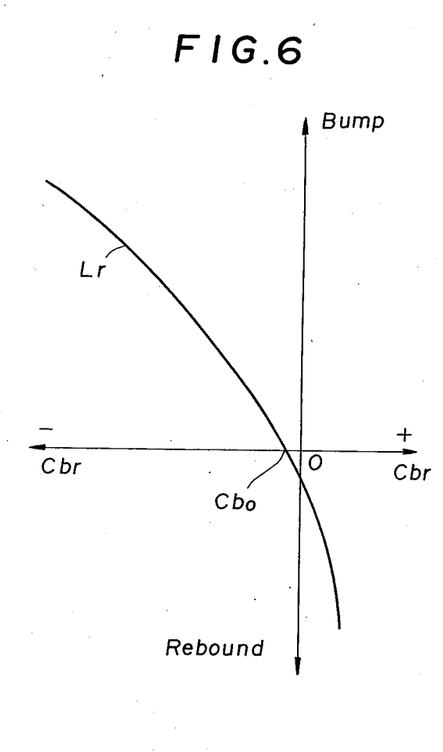

Camber Cbf of each of the front wheels Wf with respect to the vehicle body and camber Cbr of each of the rear wheels Wr with respect to the vehicle body are selected as indicated by curves Lf, Lr, respectively, in FIGS. 5 and 6.

In FIG. 5, the curve Lf for the front wheel Wf is selected such that when the front wheel Wf is in a neutral condition, the camber Cbf is zero, and when the front wheel Wf bumps, the camber Cbf is increased negatively, and when the front wheel Wf rebounds, the camber Cbf is increased positively. When the front wheel Wf is in the neutral condition, camber Cgf thereof with respect to ground is zero. Since the front wheel suspension 31 is of the double-wishbone configuration, the camber Cgf is substantially zero even when the motor vehicle 50 is making a turn.

In FIG. 6, the curve Lr for the rear wheel Wr is selected such that when the rear wheel Wr is in a neutral condition, the camber Cbr is of a slightly negative value CbO, and when the rear wheel Wr bumps, the camber Cbr is increased negatively, and when the rear wheel Wr rebounds, the camber Cbr is increased positively. When the rear wheel Wr is in the neutral condition, camber Cgr thereof with respect to ground is equal to the negative value CbO. Since the rear wheel suspension 41 is of the double-wishbone configuration, the camber Cgr is substantially zero even when the motor vehicle 50 is making a turn.

As described above, motor vehicles are generally required to make a quick turn and return to a straight course with good response upon turning of the steering wheel.

In the 4WS motor vehicle 50, the angle through which the rear wheels Wr are turned is always smaller than the angle through which the front wheels Wf are turned, and the camber Cgf, Cgr of the front and rear wheels Wf, Wr is selected to be Cgf=0 and Cgr=CbO (<0) in the neutral condition. Thus, in the neutral condition of these wheels, the camber Cgr of the rear wheel Wr with respect to ground is smaller than the camber Cgf of the front wheel Wf with respect to ground. Accordingly, both of the rear wheels Wr of the motor vehicle 50 produce cornering forces with good response upon turning of the steering wheel 12, with the result that the motor vehicle body will start a turning motion and then return to straight-course travel, with high response.

Because the front wheel suspension mechanisms 31 and the rear wheel suspension mechanisms 41 are of the same type, the front wheels Wf and the rear wheels Wr are desirably kept in good balance in a large range from a condition in which the motor vehicle runs straight to a condition in which it makes a turn.

The front front wheel suspension mechanisms 31 and the rear wheel suspension mechanisms 41 are of the same double-wishbone type. Consequently, in a range from the straight running condition to the turning condition of the motor vehicle, the rate of change of the camber Cgf, Cgr of the front and rear wheels Wf, Wr with respect to ground remains small, and as a result the full performance of the tires Tf, Tr is ensured.

Even when an additional camber thrust Tc is produced by one of the rear wheels Wr when riding on a ridge or over a bump on the road, this additional camber thrust Tc is distributed to the other rear wheel Wr through the knuckle 42, the tie rod 26, the gearbox 25, the other tie rod 26, and the other knuckle 42. As a consequence, the influence on the vehicle body of the disturbance which produces the additional camber thrust on the rear wheels is reduced. Furthermore, the additional camber thrust imposed on the rear wheel Wr by the disturbance can be directly corrected by operating the steering wheel 12. In the front wheel steering mechanism 11, one of the front wheels Wf is operatively coupled to the other front wheel Wf through the knuckle 32, the tie rod 16, the rack, the other tie rod 16, and the other knuckle 32. Therefore, even if an additional camber thrust Tc is produced by one of the front wheels Wf when riding on a ridge or a bump on the road, this additional camber thrust Tc is distributed to the other front wheel Wf through the above front wheel steering components. As a consequence, the influence on the vehicle body of the disturbance which produces the additional camber thrust on the front wheels is also reduced.

In the 4WS motor vehicle 50, the front wheel steering mechanism 11 and the rear wheel steering mechanism 21 are coupled to each other through the linkage shaft 20. Therefore, all of the front and rear wheels Wf, Wr are kept in good balance in a range from straight travel to cornering of the motor vehicle 50.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A four-wheel steerable motor vehicle comprising:
   a steering wheel;
   front wheels;
   rear wheels;
   a mechanism for steering said front wheels in response to turning motion of said steering wheel;
   a mechanism for steering said rear wheels in response to steering of said front wheels; and
   said rear wheels having camber with respect to ground which is more negative than camber of said front wheels with respect to ground.

2. A four-wheel steerable motor vehicle according to claim 1, further including front wheel suspensions supporting said front wheels, respectively, and rear wheel suspensions supporting said rear wheels, respectively, said front and rear wheel suspensions being of the same type.

3. A four-wheel steerable motor vehicle according to claim 2, wherein each of said front and rear wheel suspensions comprises a double-wishbone suspension.

4. A four-wheel steerable motor vehicle according to claim 1, wherein said camber of said rear wheels with respect to ground remains more negative than said camber of said front wheels with respect to ground when said front and rear wheels bump and rebound while the motor vehicle is making a turn.

5. A four-wheel steerable motor vehicle according to claim 1, further including:
    front knuckles supporting said front wheels, respectively;
    rear knuckles supporting said rear wheels, respectively;
    said front wheel steering mechanism having means for steering said front wheels through said front knuckles in response to turning motion of said steering wheel;
    said rear wheel steering mechanism having means for steering said rear wheels through said rear knuckles in response to steering of said front wheels;
    front wheel suspensions supporting said front wheels, respectively;
    rear wheel suspensions supporting said rear wheels, respectively;
    said rear wheel suspensions being mechanically coupled to each other by said rear wheel steering mechanism; and
    each of said rear wheel suspensions comprising one of said rear knuckles, an upper arm extending substantially horizontally transversely of the motor vehicle and being vertically swingably attached at an inner end thereof to a body of the motor vehicle, and a lower arm extending substantially horizontally transversely of the motor vehicle and being vertically swingably attached at an inner end thereof to the body of the motor vehicle.

6. A four-wheel steerable motor vehicle according to claim 5, wherein said front wheel suspenions are mechanically coupled to each other by said front wheel steering mechanism, each of said front wheel suspensions comprising one of said front knuckles, an upper arm extending substantially horizontally transversely of the motor vehicle and being vertically swingably attached at an inner end thereof to the body of the motor vehicle, and a lower arm extending substantially horizontally transversely of the motor vehicle and being vertically swingably attached at an inner end thereof to the body of the motor vehicle.

7. A four-wheel steerable motor vehicle according to claim 5, wherein said upper arm of each of said rear wheel suspensions is relatively short, and said lower arm of each of said rear wheel suspensions is relatively long.

8. A four-wheel steerable motor vehicle according to claim 6, wherein said upper arm of each of said front wheel suspensions is relatively short, and said lower arm of each of said front wheel suspensions is relatively long.

9. A four-wheel steerable motor vehicle according to claim 1, wherein said rear wheel steering mechanism has means for steering said rear wheels through an angle which is smaller at all times than the angle through which said front wheels are steered.

* * * * *

UNITED STATES PATENT AND TRADEMARK OFFICE
CERTIFICATE OF CORRECTION

PATENT NO. : 4,805,940

DATED : February 21, 1989

INVENTOR(S) : Ohno et al.

It is certified that error appears in the above-identified patent and that said Letters Patent is hereby corrected as shown below:

Column 4, lines 46 and 47, change "doublewishbone" to --double-wishbone--.
Column 5, line 63, delete "front" (first occurrence).
Column 8, line 4, change "suspenions" to --suspensions--.

Signed and Sealed this

Ninth Day of January, 1990

Attest:

JEFFREY M. SAMUELS

Attesting Officer     Acting Commissioner of Patents and Trademarks